(12) United States Patent
Jeong et al.

(10) Patent No.: US 12,275,287 B2
(45) Date of Patent: Apr. 15, 2025

(54) VEHICULAR HEAT MANAGEMENT SYSTEM

(71) Applicant: Hanon Systems, Daejeon (KR)

(72) Inventors: Dae Yeop Jeong, Daejeon (KR); Chul Soon Kim, Daejeon (KR); Sang Jun Yoo, Daejeon (KR); Hong Rae Jung, Daejeon (KR); Tak Jun Kim, Daejeon (KR); Goong Jun Nam, Daejeon (KR); Hee Jin Ryu, Daejeon (KR); Jae Woo Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 206 days.

(21) Appl. No.: 17/907,788

(22) PCT Filed: Jul. 30, 2021

(86) PCT No.: PCT/KR2021/009948
§ 371 (c)(1),
(2) Date: Aug. 29, 2022

(87) PCT Pub. No.: WO2022/045604
PCT Pub. Date: Mar. 3, 2022

(65) Prior Publication Data
US 2023/0173873 A1    Jun. 8, 2023

(30) Foreign Application Priority Data
Aug. 27, 2020 (KR) .................. 10-2020-0108594

(51) Int. Cl.
*B60H 1/32* (2006.01)
*B60H 1/00* (2006.01)

(52) U.S. Cl.
CPC ..... *B60H 1/00278* (2013.01); *B60H 1/00807* (2013.01); *B60H 1/00885* (2013.01);
(Continued)

(58) Field of Classification Search
CPC ............ B60H 1/00278; B60H 1/32281; B60H 1/00807; B60H 1/00885; B60H 1/3211; B60H 2001/3267; B60H 2001/3285
See application file for complete search history.

(56) References Cited

U.S. PATENT DOCUMENTS

2007/0000262 A1* 1/2007 Ikegami .................. F25B 41/00
                                                                62/170
2017/0313158 A1   11/2017 Porras et al.

FOREIGN PATENT DOCUMENTS

CN    113844231 A  * 12/2021
JP    2020034228 A    3/2020
(Continued)

OTHER PUBLICATIONS

Dang, Opening control method for electronic expansion valve of evaporator and battery plate type heat exchanger, 2021, Full Document (Year: 2021).*

*Primary Examiner* — Nael N Babaa
(74) *Attorney, Agent, or Firm* — NORTON ROSE FULBRIGHT US LLP

(57) ABSTRACT

The present invention relates to a vehicular heat management system capable of inducing an increase in refrigerant superheat degree without unconditionally turning off a compressor when the refrigerant superheat degree on the discharge side of a chiller is less than or equal to a lower limit value.

The vehicular heat management system includes: a compressor; a condensing heat exchanger; an expansion valve; an evaporation heat exchanger; and a control part configured to, when a refrigerant superheat degree on a discharge side of the evaporation heat exchanger is lowered to a predetermined lower limit value or less, control, step by step, at least two devices directly involved in the increase and decrease of the refrigerant superheat degree to increase the refrigerant (Continued)

superheat degree until the refrigerant superheat degree exceeds the lower limit value.

11 Claims, 10 Drawing Sheets

(52) U.S. Cl.
CPC ....... *B60H 1/3211* (2013.01); *B60H 1/32281* (2019.05); *B60H 1/323* (2013.01); *B60H 2001/00307* (2013.01); *B60H 2001/3263* (2013.01); *B60H 2001/3267* (2013.01); *B60H 2001/3272* (2013.01); *B60H 2001/3285* (2013.01)

(56) References Cited

FOREIGN PATENT DOCUMENTS

| | | |
|---|---|---|
| KR | 101261046 B1 | 5/2013 |
| KR | 20150123362 A | 11/2015 |
| KR | 20180061285 A | 6/2018 |

* cited by examiner

PRIOR ART

VEHICULAR HEAT MANAGEMENT SYSTEM

CROSS REFERENCE TO RELATED APPLICATION

This application is a national phase under 35 U.S.C. § 371 of International Application No. PCT/KR2021/009948 filed on Jul. 30, 2021, which claims the benefit of priority from Korean Application No. 10-2020-0108594 filed on Aug. 27, 2020. The entire contents of these applications are incorporated herein by reference in their entirety.

TECHNICAL FIELD

The present invention relates to a vehicular heat management system and, more particularly, to a vehicular heat management system capable of inducing an increase in refrigerant superheat degree without unconditionally turning off a compressor when the refrigerant superheat degree on the discharge side of a chiller is less than or equal to a lower limit value, minimizing the turnoff of the compressor under a condition that the refrigerant superheat degree is less than or equal to a lower limit value, and consequently minimizing the operation stop of the chiller due to the frequent turnoff of the compressor and the resultant stop of cooling of a battery.

BACKGROUND ART

Examples of an eco-friendly vehicle include an electric vehicle, a hybrid vehicle and a fuel cell vehicle (hereinafter collectively referred to as "vehicle").

As shown in FIG. 1, such a vehicle is equipped with an air conditioner 10 for cooling and heating an air conditioning region.

The air conditioner 10 is provided with a refrigerant circulation line 12. The refrigerant circulation line 12 includes a compressor 14, a condensing heat exchanger 16, an evaporation heat exchanger 18, a chiller 20, which is a type of evaporation heat exchanger, a vehicle-interior-cooling expansion valve 18a, and a battery-cooling expansion valve 20a. The evaporation heat exchanger 18 and the chiller 20 are installed parallel to each other. The vehicle-interior-cooling expansion valve 18a and the battery-cooling expansion valve 20a are installed on the upstream sides of the evaporation heat exchanger 18 and the chiller 20.

In particular, the battery-cooling expansion valve 20a and the chiller 20 depressurize and expand the refrigerant passed through the condensing heat exchanger 16 to generate cold air. The generated cold air is transferred to the battery B through a cooling water circulation line 22, thereby cooling the battery B.

In this regard, the battery-cooling expansion valve 20a is an electromagnetic expansion valve EXV, and is configured to have a variable opening degree according to the superheat degree of the refrigerant discharged from the chiller 20. In particular, the opening degree of the battery-cooling expansion valve 20a is configured to vary in proportion to the superheat degree of the refrigerant discharged from the chiller 20.

Accordingly, the amount of refrigerant introduced into the chiller 20 is automatically adjusted in response to the heat load of the chiller 20, and consequently, the cooling performance of the chiller 20 is automatically adjusted according to the heat load of the chiller 20.

Meanwhile, the air conditioner is configured to turn off the compressor 14 when the superheat degree of the refrigerant on the discharge side of the chiller 20 is less than or equal to a preset lower limit.

The reason for this configuration is that when the superheat degree of the refrigerant on the discharge side of the chiller 20 is less than or equal to the lower limit, the liquid phase ratio of the refrigerant becomes excessively high. If the refrigerant having such a high liquid phase ratio returns to the compressor 14, the compressor 14 may be damaged.

Accordingly, when the superheat degree of the refrigerant on the discharge side of the chiller 20 is less than or equal to the lower limit, the compressor 14 is turned off to limit the introduction of the refrigerant having a high liquid phase ratio to the compressor 14 side and to induce an increase in the superheat degree of the refrigerant.

Since such a conventional heat management system has a structure in which the compressor 14 is turned off according to the superheat degree of the refrigerant, the operation of the chiller 20 is also stopped while the compressor 14 is turned off. As a result, the cooling of the battery B is stopped. For that reason, the battery B is overheated, which may lead to performance reduction or damage of the battery B.

In addition, since the conventional heat management system has a structure in which the compressor 14 is turned off whenever the superheat degree of the refrigerant is lowered to the lower limit or less, the compressor 14 is frequently turned on and off. This may significantly reduce the durability of the compressor 14.

SUMMARY

In view of the problems inherent in the related art, it is an object of the present invention to provide a vehicular heat management system capable of inducing an increase in refrigerant superheat degree without unconditionally turning off a compressor when the refrigerant superheat degree on the discharge side of a chiller is less than or equal to a lower limit value.

Another object of the present invention is to provide a vehicular heat management system capable of minimizing the turnoff of a compressor under a condition that a refrigerant superheat degree is less than or equal to a lower limit value.

A further object of the present invention is to provide a vehicular heat management system capable of minimizing the operation stop of a chiller due to the frequent turnoff of a compressor and the resultant stop of cooling of a battery.

A still further object of the present invention is to provide a vehicular heat management system capable of preventing the overheating of a battery due to the turnoff of a compressor and the resultant performance reduction and damage of the battery.

A yet still further object of the present invention is to provide a vehicular heat management system capable of preventing the frequent on/off operation of a compressor under a condition that a refrigerant superheat degree is less than or equal to a lower limit value.

An even yet still further object of the present invention is to provide a vehicular heat management system capable of preventing the durability reduction and damage of a compressor due to the frequent on/off operation of the compressor.

In order to achieve these objects, there is provided a vehicular heat management system, including: a compressor; a condensing heat exchanger; an expansion valve; an evaporation heat exchanger; and a control part configured to, when a refrigerant superheat degree on a discharge side of the evaporation heat exchanger is lowered to a predetermined lower limit value or less, control, step by step, at least two devices directly involved in the increase and decrease of the refrigerant superheat degree to increase the refrigerant superheat degree until the refrigerant superheat degree exceeds the lower limit value.

In the system, the evaporation heat exchanger includes a plurality of evaporation heat exchangers, the expansion valve on the upstream side of one of the plurality of evaporation heat exchangers is an electromagnetic expansion valve (EXV), and the control part is configured to, when a refrigerant superheat degree on the discharge side of an electromagnetic-expansion-valve-side evaporation heat exchanger is lowered to the lower limit value or less, control the compressor and the electromagnetic expansion valve to increase the refrigerant superheat degree until the refrigerant superheat degree exceeds the lower limit value.

In the system, the plurality of evaporation heat exchangers includes a chiller for cooling a battery, and the control part is configured to, when a refrigerant superheat degree on the discharge side of the chiller is lowered to the lower limit value or less, control a rotation speed of the compressor and an opening degree of an electromagnetic battery-cooling expansion valve to increase the refrigerant superheat degree until the refrigerant superheat degree exceeds the lower limit value.

In the system, when the refrigerant superheat degree on the discharge side of the chiller is lowered to the lower limit value or less, the control part is configured to: firstly reduce the opening degree of the battery-cooling expansion valve to induce an increase in the refrigerant superheat degree on the discharge side of the chiller in a first step; secondly reduce the rotation speed of the compressor to induce an increase in the refrigerant superheat degree on the discharge side of the chiller in a second step; and thirdly completely turn off one of the battery-cooling expansion valve and the compressor to limit a refrigerant flow toward the chiller to induce an increase in the refrigerant superheat degree on the discharge side of the chiller in a third step, so that the refrigerant superheat degree on the discharge side of the chiller exceeds the lower limit value.

In the system, the control part is configured to: enter a first step mode to reduce the opening degree of the battery-cooling expansion valve by a preset value when the refrigerant superheat degree on the discharge side of the chiller is lowered to the lower limit value or less and is then maintained less than or equal to the lower limit value for a preset time; enter a second step mode to reduce the rotation speed of the compressor by a preset value when the refrigerant superheat degree on the discharge side of the chiller is less than or equal to the lower limit value after the opening degree of the battery-cooling expansion valve is reduced; and enter a third step mode to completely turn off one of the battery-cooling expansion valve and the compressor according to an air conditioning mode state to limit a refrigerant flow toward the chiller when the refrigerant superheat degree on the discharge side of the chiller is less than or equal to the lower limit value after the rotation speed of the compressor is reduced.

According to the vehicular heat management system of the present invention, when the refrigerant superheat degree on the discharge side of the chiller is less than or equal to the lower limit value, the battery-cooling expansion valve and the compressor are sequentially controlled to increase the refrigerant superheat degree step by step until the refrigerant superheat degree exceeds the lower limit value. Therefore, it is possible to induce an increase in the refrigerant superheat degree without unconditionally turning off the compressor when the refrigerant superheat degree is less than or equal to the lower limit value.

Since the increase in the refrigerant superheat degree can be induced without unconditionally turning off the compressor, it is possible to minimize the turnoff of the compressor under a condition that the refrigerant superheat degree is less than or equal to the lower limit value.

Since the turnoff of the compressor can be minimized under the condition that the refrigerant superheat degree is less than or equal to the lower limit value, it is possible to minimize the operation stop of the chiller due to the frequent turnoff of the compressor and the resultant stop of cooling of the battery. Thus, it is possible to prevent the overheating of the battery due to the turnoff of the compressor and the resultant performance reduction and damage of the battery.

Since the turnoff of the compressor can be minimized when the refrigerant superheat degree is less than or equal to the lower limit value, it is possible to prevent the frequent on/off operation of the compressor under the condition that the refrigerant superheat degree is less than or equal to the lower limit value. As a result, it is possible to prevent the durability reduction and damage of the compressor due to the frequent on/off operation of the compressor.

DETAILED DESCRIPTION

Figure 1:
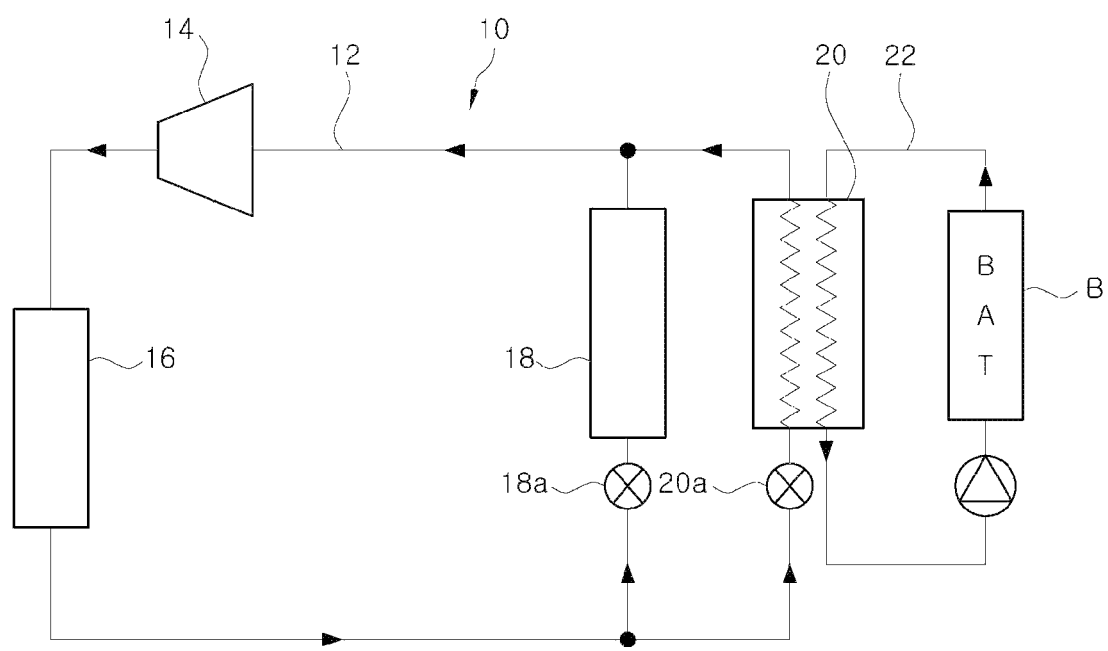
FIG. 1 is a view showing a conventional vehicular heat management system.

Preferred embodiments of a vehicular heat management system according to the present invention will now be described in detail with reference to the accompanying drawings.

First Embodiment

Prior to describing the features of the vehicular heat management system according to the present invention, the general configurations of the vehicular heat management system will be briefly described with reference to FIG. 2.

The vehicular heat management system includes an air conditioner 10 for cooling and heating an air conditioning region.

The air conditioner 10 includes a refrigerant circulation line 12. The refrigerant circulation line 12 includes a compressor 14, a condensing heat exchanger 16, an evaporation heat exchanger 18, a chiller 20, which is a type of evaporation heat exchanger, a vehicle-interior-cooling expansion valve 18a, and a battery-cooling expansion valve 20a. The evaporation heat exchanger 18 and the chiller 20 are installed parallel to each other. The vehicle-interior-cooling expansion valve 18a and the battery-cooling expansion valve 20a are installed on the upstream sides of the evaporation heat exchanger 18 and the chiller 20.

In particular, the battery-cooling expansion valve 20a and the chiller 20 depressurize and expand the refrigerant passed through the condensing heat exchanger 16 to generate cold air. The generated cold air is transferred to the battery B through a cooling water circulation line 22, thereby cooling the battery B.

The battery-cooling expansion valve 20a is an electromagnetic expansion valve (EXV), and is configured to have a variable opening degree according to the superheat degree of the refrigerant discharged from the chiller 20.

Next, the features of the vehicular heat management system according to the present invention will be described in detail with reference to FIGS. 2 to 7.

Figure 2:
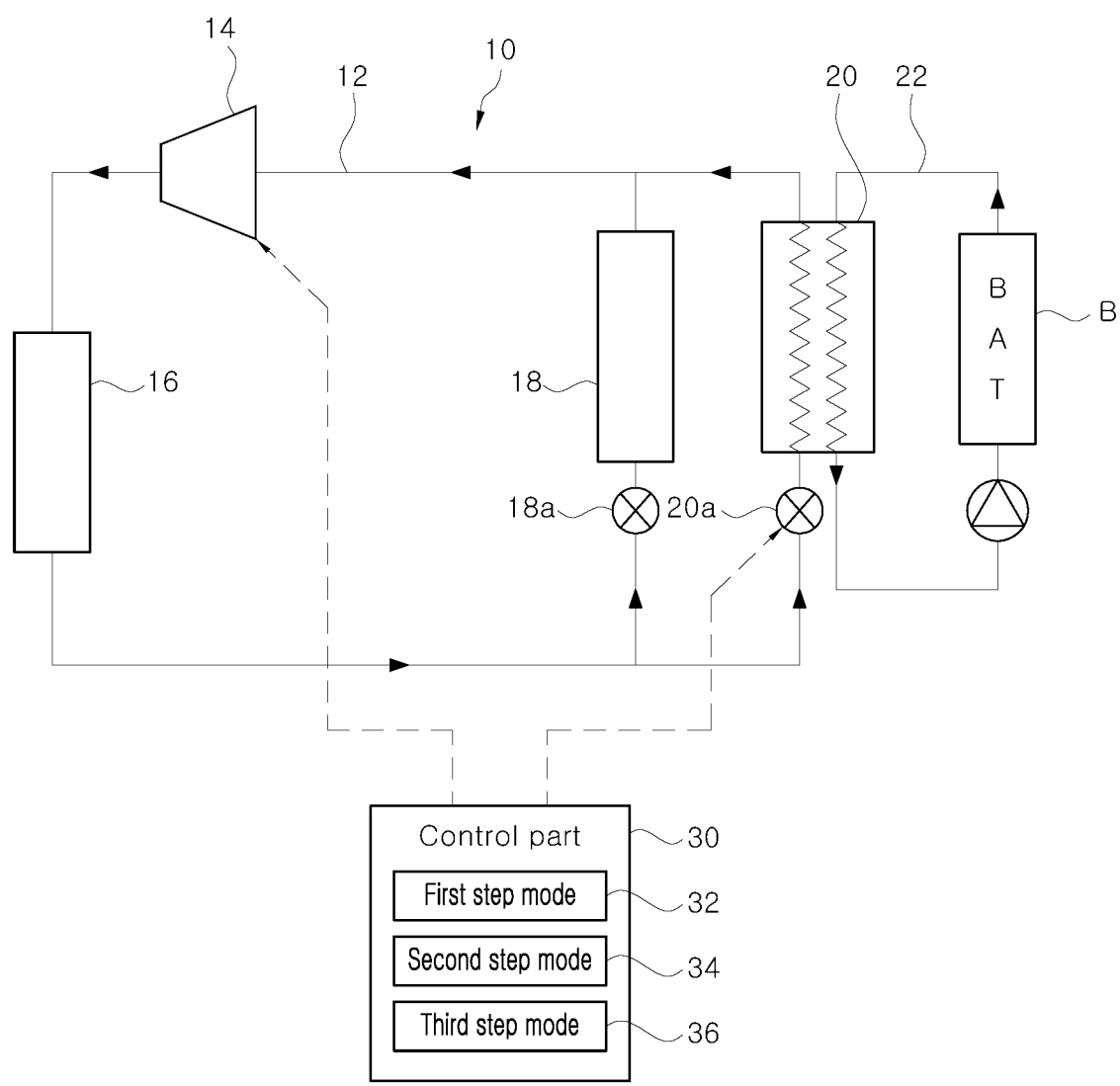
FIG. 2 is a view showing a vehicular heat management system according to a first embodiment of the present invention.

Referring first to FIG. 2, the heat management system of the present invention includes a control part 30 configured to increase the superheat degree of the refrigerant to a value exceeding a lower limit value when the refrigerant superheat degree on the discharge side of the chiller 20 is lowered to a preset lower limit value or less.

The control part 30 is equipped with a microprocessor. When the refrigerant superheat degree on the discharge side of the chiller 20 is continuously maintained for a preset time in a state in which the refrigerant superheat degree is lowered to the lower limit value or less, the control part 30 controls, step by step, the devices directly involved in the increase and decrease of the refrigerant superheat degree, for example, the battery-cooling expansion valve 20a and the compressor 14 so that the refrigerant superheat degree is increased to a value exceeding the lower limit value.

Figure 3:
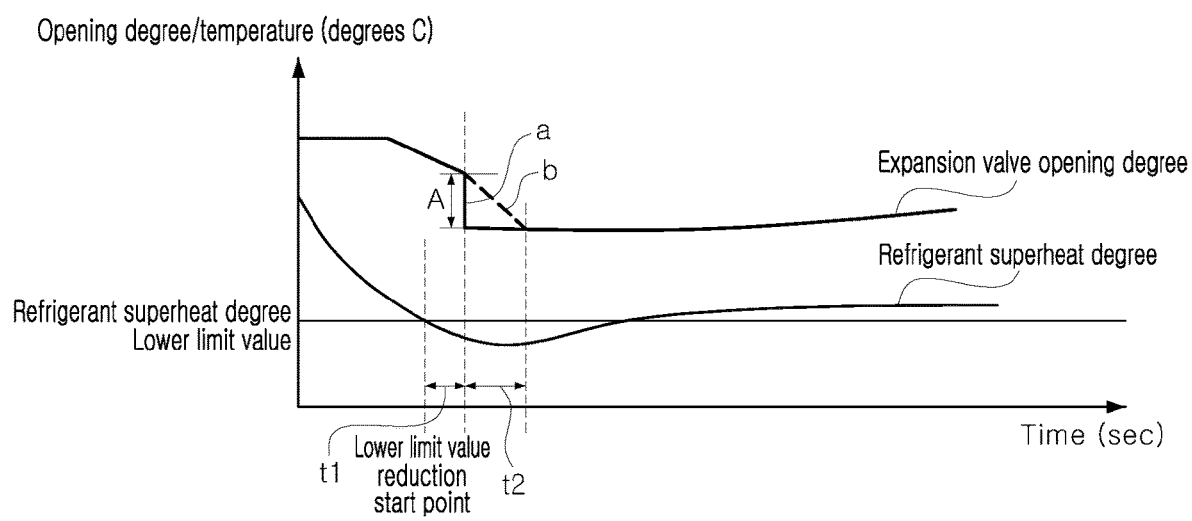
FIG. 3 is a view showing an operation example of the vehicular heat management system according to the present invention, and is a logic diagram showing a state in which when the refrigerant superheat degree on the discharge side of a chiller is lowered to become less than or equal to a lower limit value, the opening degree of a battery-cooling expansion valve is controlled to induce an increase in a refrigerant superheat degree.

In more detail, as shown in FIGS. 2 and 3, if it is determined that the refrigerant superheat degree on the discharge side of the chiller 20 is lowered to the lower limit value or less and a preset time t1 has elapsed from the time at which the refrigerant superheat degree is lowered to the lower limit value or less, the control part 30 enters a first step mode 32 to reduce the opening degree of the battery-cooling expansion valve 20a by a preset amount (A).

Accordingly, the amount of depressurization and expansion of the refrigerant introduced into the chiller 20 is reduced. As a result, the refrigerant superheat degree on the discharge side of the chiller 20 is induced to increase in a first step. In particular, the refrigerant superheat degree is induced in a first step to increase to a value exceeding the lower limit value.

When entering the first step mode 32, the control part 30 reduces the opening degree of the battery-cooling expansion valve 20a by a preset value A. As shown in FIG. 3, the opening degree of the battery-cooling expansion valve 20a may be reduced immediately in a stepwise manner (a), or may be reduced linearly (b) with a constant slope for a predetermined time t2.

Referring again to FIG. 2, the control part 30 continuously checks the refrigerant superheat degree on the discharge side of the chiller 20 while reducing the opening degree of the battery-cooling expansion valve 20a. In this process, the control part 30 determines whether the refrigerant superheat degree on the discharge side of the chiller 20 exceeds an increased superheat degree value (hereinafter referred to as "increased value") which is larger than the lower limit value by a predetermined value a.

If the determination result indicates that the refrigerant superheat degree exceeds the increased value, the control part 30 determines that the excessive decrease in the refrigerant superheat degree has been resolved, and returns the opening degree of the battery-cooling expansion valve 20a to its original value. In particular, the opening degree of the battery-cooling expansion valve 20a is returned to the value available before the first step mode 32.

On the other hand, if the determination result indicates that the refrigerant superheat degree does not exceed the increased value, the control part 30 determines again whether the refrigerant superheat degree on the discharge side of the chiller 20 is less than or equal to the lower limit value.

If the determination result indicates that the refrigerant superheat degree is not less than the lower limit value, i.e., a value between the lower limit value and the upper limit value, the control part 30 performs control so that the opening degree of the battery-cooling expansion valve 20a continues to be kept in a reduced state. Accordingly, the refrigerant superheat degree on the discharge side of the chiller 20 is induced to continuously increase until the refrigerant superheat degree exceeds the increased value.

Figure 4:
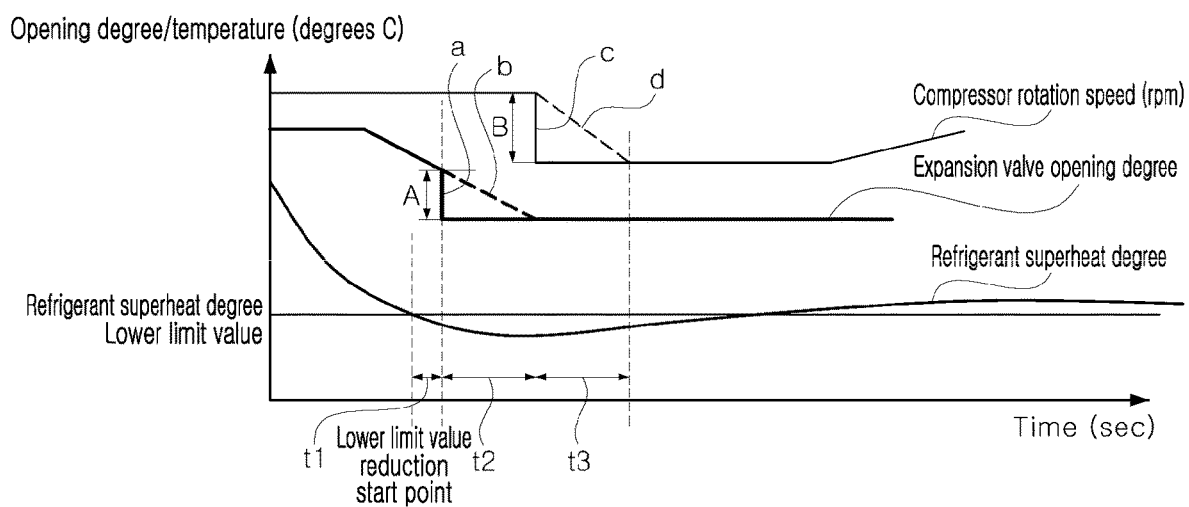
FIG. 4 is a view showing an operation example of the vehicular heat management system according to the present invention, and is a logic diagram showing a state in which when the refrigerant superheat degree on the discharge side of a chiller is lowered to become less than or equal to a lower limit value, the rotation speed of the compressor is controlled to induce an increase in a refrigerant superheat degree.

On the other hand, if the determination result indicates that the refrigerant superheat degree is still less than or equal to the lower limit value, the control part 30 enters a second step mode 34. Then, as shown in FIGS. 2 and 4, the control part 30 entering the second step mode 34 reduces the rotation speed of the compressor 14 by a preset value B. Accordingly, the total amount of the refrigerant introduced into the battery-cooling expansion valve 20a and the chiller 20 is reduced.

As a result, the amount of depressurization and expansion of the refrigerant introduced into the chiller 20 is reduced to induce the refrigerant superheat degree on the discharge side of the chiller 20 to increase in a second step. In particular, the refrigerant superheating degree is induced in a second step to increase to a value exceeding the lower limit value.

When entering the second step mode 34, the control part 30 reduces the rotation speed of the compressor 14 by a preset value B in advance. As shown in FIG. 4, the rotation speed of the compressor 14 may be reduced immediately in a stepwise manner (c), or may be reduced linearly (d) with a constant slope for a predetermined time t3.

Referring again to FIG. 2, the control part 30 continuously checks the refrigerant superheat degree on the discharge side of the chiller 20 while reducing the rotation speed of the compressor 14. In this process, the control part 30 determines whether the refrigerant superheat degree on the discharge side of the chiller 20 exceeds an increased value which is larger than the lower limit value by a predetermined value a.

If the determination result indicates that the refrigerant superheat degree exceeds the increased value, the control part 30 determines that the excessive decrease in the refrigerant superheat degree has been resolved, and returns the rotation speed of the compressor 14 to its original value and returns the opening degree of the battery-cooling expansion valve 20a to its original value. In particular, the rotation speed of the compressor 14 and the opening degree of the battery-cooling expansion valve 20a are returned to the values available before the first step mode 32.

On the other hand, if the determination result indicates that the refrigerant superheat degree does not exceed the increased value, the control part 30 determines again whether the refrigerant superheat degree on the discharge side of the chiller 20 is less than or equal to the lower limit value.

If the determination result indicates that the refrigerant superheat degree is not less than the lower limit value, the control part 30 performs control so that the rotation speed of the compressor 14 continues to be kept in a reduced state. Accordingly, the refrigerant superheat degree on the discharge side of the chiller 20 is induced to continuously increase until the refrigerant superheat degree exceeds the increased value.

On the other hand, if the determination result indicates that the refrigerant superheat degree is still less than the lower limit value, the control part 30 recognizes that the refrigerant superheat degree on the discharge side of the chiller 20 does not exceed the lower limit value despite the primary and secondary induction of an increase in the refrigerant superheat degree.

Upon such recognition, the control part 30 enters a third step mode (36). The control part 30 entering the third step mode 36 is configured to completely turn off at least one of the battery-cooling expansion valve 20a and the compressor 14 according to the air conditioning mode.

In more detail, when entering the third step mode 36, the control part 30 determines whether the current air conditioning mode is a battery independent cooling mode or a vehicle interior/battery simultaneous cooling mode.

Figure 5:
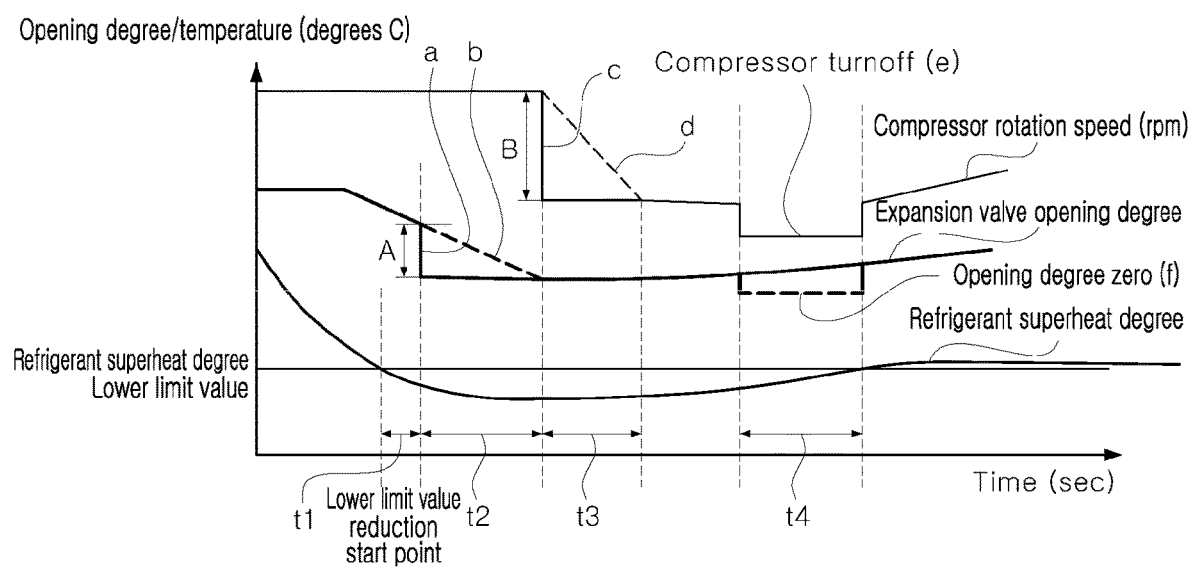
FIG. 5 is a view showing an operation example of the vehicular heat management system according to the present invention, and is a logic diagram showing a state in which when the refrigerant superheat degree on the discharge side of a chiller is lowered to become less than or equal to a lower limit value, the compressor is controlled under a battery independent cooling mode condition to induce an increase in a refrigerant superheat degree.

If the determination result indicates that the current air conditioning mode is a battery independent cooling mode, as shown in FIGS. 2 and 5, the control part 30 maintains the opening degree of the battery-cooling expansion valve 20a as it is, and completely turns off the compressor 14 (e).

Accordingly, the refrigerant flow to the battery-cooling expansion valve 20a and the chiller 20 is completely blocked. As a result, the refrigerant superheat degree on the discharge side of the chiller 20 is induced to increase in a third step. In particular, the refrigerant superheat degree is induced in a third step to increase to a value exceeding the lower limit value.

When entering the third step mode 36, in some cases, the control part 30 also turns off the battery-cooling expansion valve 20a completely (f), and can control the opening degree of the battery-cooling expansion valve 20a to become zero.

In this case, the refrigerant introduction into the chiller 20 is completely blocked, and as a result, the refrigerant superheat degree on the discharge side of the chiller 20 is increased to a value exceeding the lower limit value.

On the other hand, if it is determined that after the compressor 14 is turned off (e), a preset time t4 has elapsed, or the refrigerant superheat degree on the discharge side of the chiller 20 exceeds the increased value which is larger than the lower limit value by a predetermined value a, the control part 30 turns on the compressor 14 and returns the compressor 14 to its original state, and also returns the opening degree of the battery-cooling expansion valve 20a to its original value. In particular, the control part 30 returns the compressor 14 and the opening degree of the battery-cooling expansion valve 20a to the state or value available before the first step mode 32.

Figure 6:
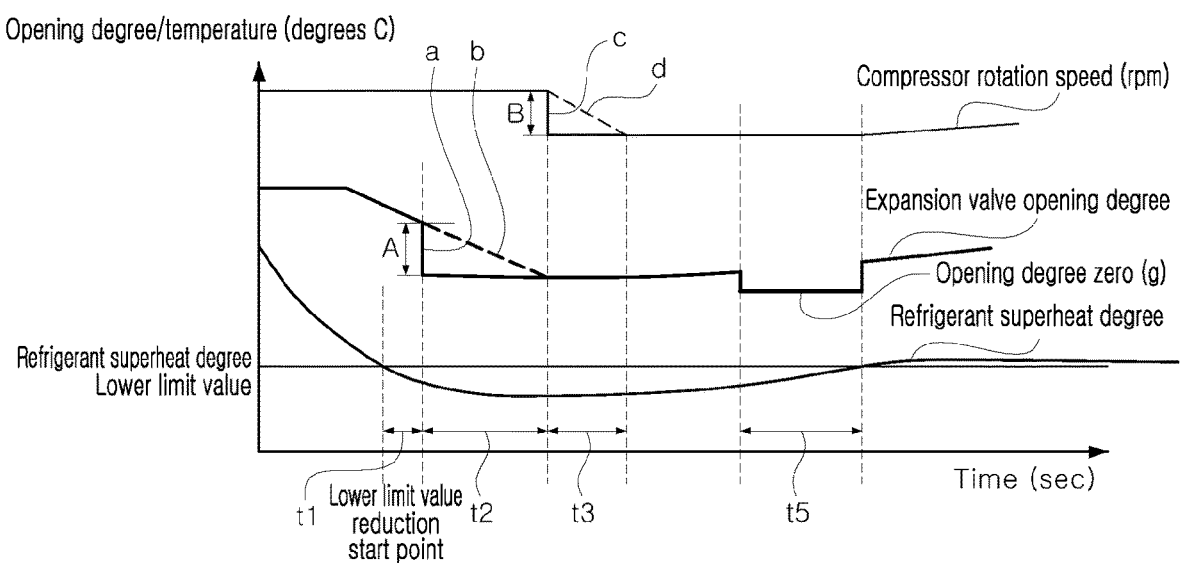
FIG. 6 is a view showing an operation example of the vehicular heat management system according to the present invention, and is a logic diagram showing a state in which when the refrigerant superheat degree on the discharge side of a chiller is lowered to become less than or equal to a lower limit value, the opening degree of a battery-cooling expansion valve is controlled under a vehicle interior/battery simultaneous cooling mode condition to induce an increase in a refrigerant superheat degree.

Referring again to FIG. 2, if the determination result indicates that the current air conditioning mode is a vehicle interior/battery simultaneous cooling mode, as shown in FIGS. 2 and 6, the control part 30 maintains the rotation speed of the compressor 14 as it is, and completely turns off the battery-cooling expansion valve 20a (g) to control the opening degree thereof to become zero.

Accordingly, the introduction of the refrigerant into the chiller 20 is completely blocked, thereby allowing the refrigerant superheat degree on the discharge side of the chiller 20 to increase beyond the lower limit value.

On the other hand, if it is determined that after the battery-cooling expansion valve 20a is turned off (g), a preset time t5 has elapsed, or the refrigerant superheat degree on the discharge side of the chiller 20 exceeds the increased value which is larger than the lower limit value by a predetermined value a, the control part 30 turns on the battery-cooling expansion valve 20a and returns the opening degree thereof to its original value, and also returns the rotation speed of the compressor 14 to its original value. In particular, the control part 30 returns the opening degree of the battery-cooling expansion valve 20a and the rotation speed of the compressor 14 to the values available before the first step mode 32.

Next, an operation example of the vehicular heat management system according to present invention having such a configuration will be described in detail with reference to FIGS. 2 to 8.

Figure 7:
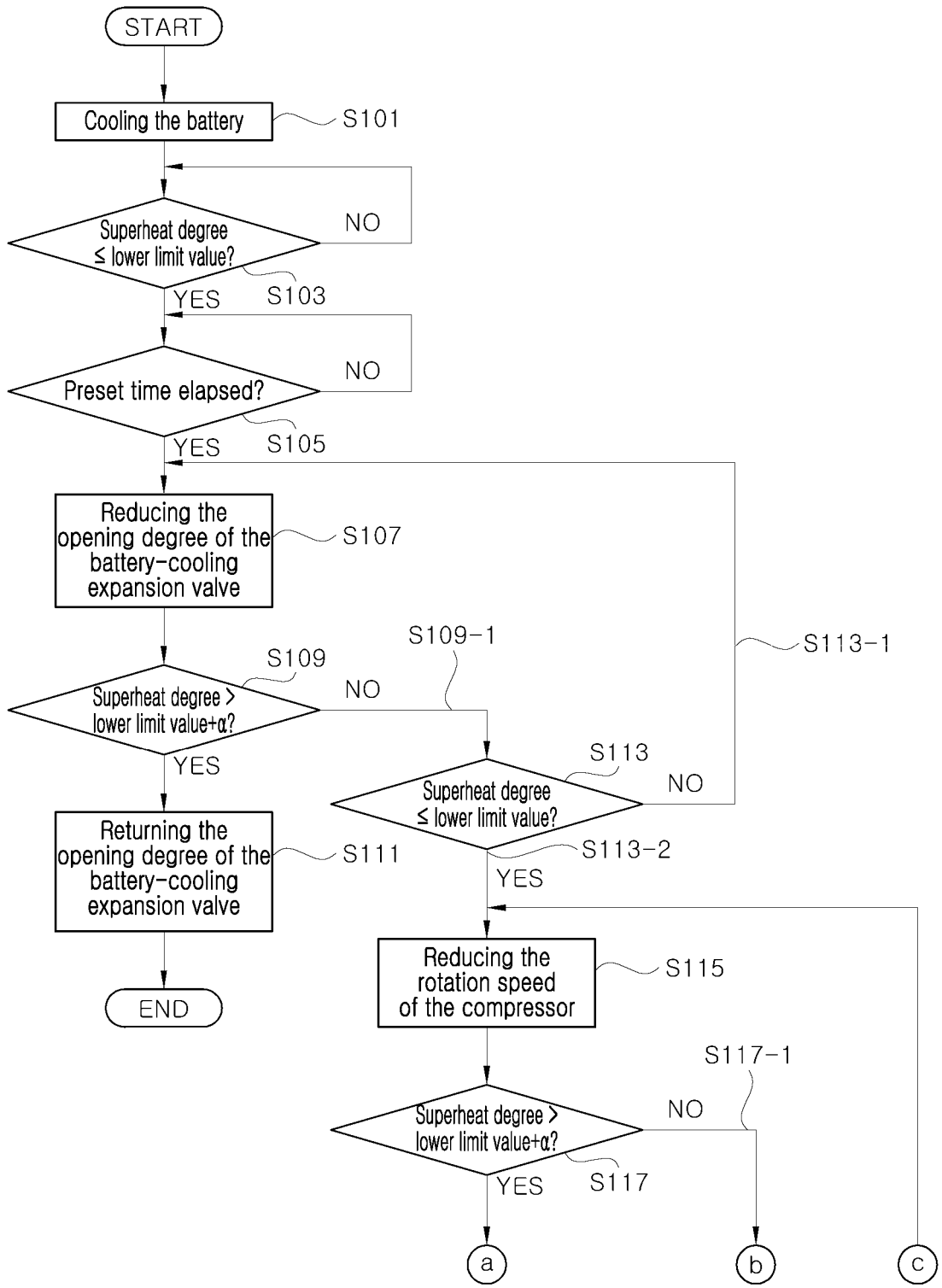
FIGS. 7 and 8 are flowcharts showing an operation example of the vehicular heat management system according to the first embodiment of the present invention.
Figure 8:
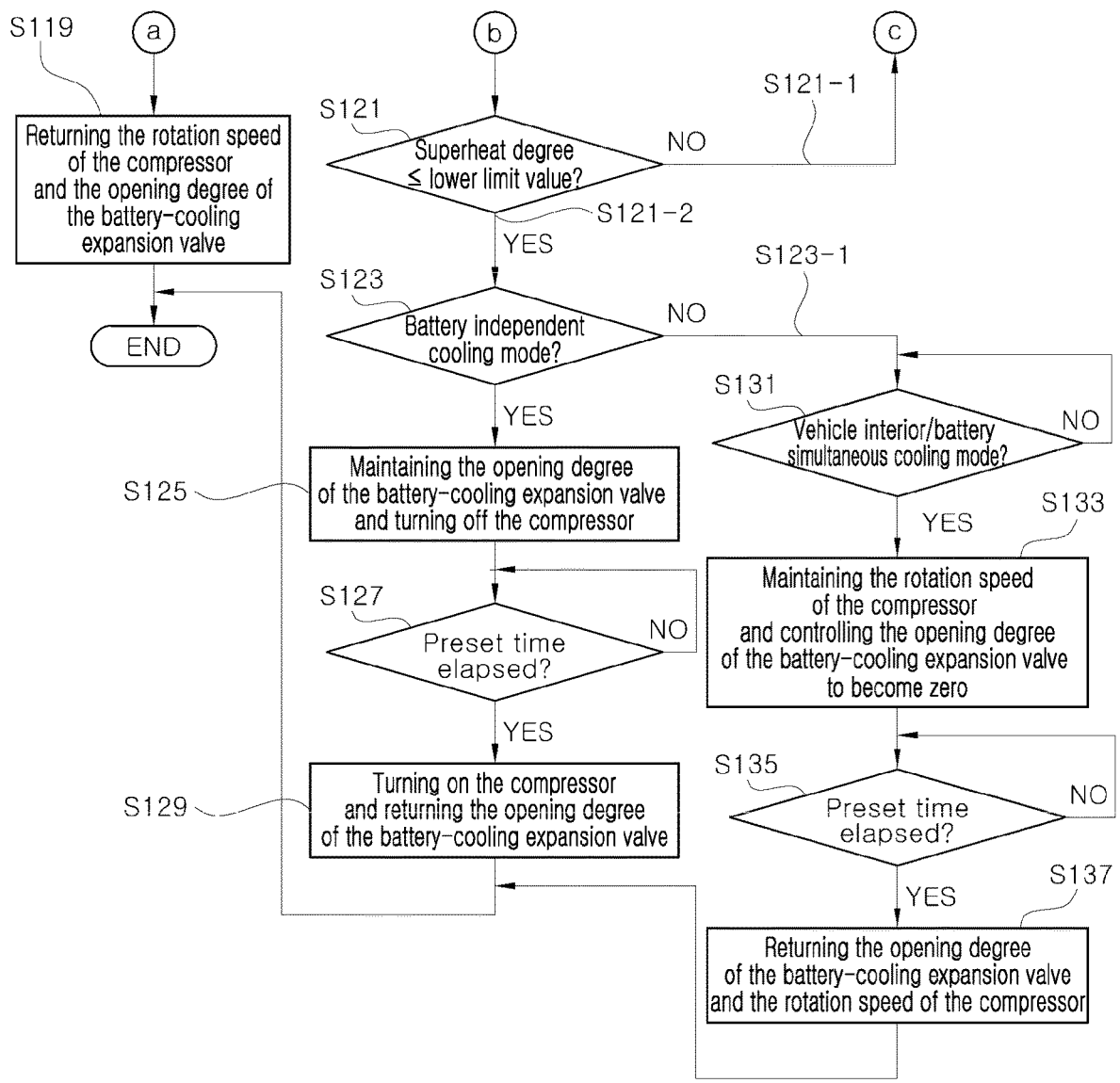

Referring first to FIGS. 7, 8 and 2, while the battery B is being cooled with the refrigerant of the air conditioner 10 (S101), it is determined whether the refrigerant superheat degree on the discharge side of the chiller 20 is less than or equal to the lower limit value (S103).

If the determination result indicates that the refrigerant superheat degree is less than or equal to the lower limit value, the control unit 30 determines again whether a preset time t1 has elapsed after the refrigerant superheat degree is lowered to the lower limit value or less (S105).

If the determination result indicates that the preset time t1 has elapsed, the control part 30 decreases the opening degree of the battery-cooling expansion valve 20a by a preset amount A while entering the first step mode 32 (S107).

Then, the depressurization and expansion amount of the refrigerant introduced into the chiller 20 is reduced, and as shown in FIG. 3, the refrigerant superheat degree on the discharge side of the chiller 20 is increased in a first step.

As shown in FIG. 7, after reducing the opening degree of the battery-cooling expansion valve 20a (S107), the control part 30 determines again whether the refrigerant superheat degree on the discharge side of the chiller 20 exceeds an increased value which is larger than the lower limit value by a predetermined value a (S109).

If the determination result indicates that the refrigerant superheat degree exceeds the increased value, the control part 30 determines that the excessive decrease in the refrigerant superheat degree has been resolved, and returns the opening degree of the battery-cooling expansion valve 20a to its original value (S111).

On the other hand, if the determination result indicates that the refrigerant superheat degree does not exceed the increased value, the control part 30 determines again whether the refrigerant superheat degree on the discharge side of the chiller 20 is less than or equal to the lower limit value (S113).

If the determination result indicates that the refrigerant superheat degree is not less than the lower limit value (S113-1), i.e., a value between the lower limit value and the upper limit value, the control part 30 performs control so that the opening degree of the battery-cooling expansion valve 20a continues to be kept in a reduced state (S107). Accordingly, the refrigerant superheat degree on the discharge side of the chiller 20 is induced to continuously increase until the refrigerant superheat degree exceeds the increased value.

On the other hand, if the determination result indicates that the refrigerant superheat degree is still less than or equal to the lower limit value (S113-2), the control part 30 enters a second step mode 34 to reduce the rotation speed of the compressor 14 by a preset value B (S115).

Accordingly, the total amount of the refrigerant introduced into the battery-cooling expansion valve 20a and the chiller 20 is reduced. As a result, the amount of depressurization and expansion of the refrigerant introduced into the chiller 20 is reduced to induce the refrigerant superheat degree on the discharge side of the chiller 20 to increase in a second step as shown in FIG. 4.

Referring to FIGS. 7, 8 and 2, while reducing the rotation speed of the compressor 14, the control part 30 determines again whether the refrigerant superheat degree on the discharge side of the chiller 20 exceeds an increased value which is larger than the lower limit value by a predetermined value a (S117).

If the determination result indicates that the refrigerant superheat degree exceeds the increased value, the control part 30 determines that the excessive decrease in the refrigerant superheat degree has been resolved, and returns the rotation speed of the compressor 14 to its original value and returns the opening degree of the battery-cooling expansion valve 20a to its original value (S119).

On the other hand, if the determination result indicates that the refrigerant superheat degree does not exceed the increased value (S117-1), the control part 30 determines again whether the refrigerant superheat degree on the discharge side of the chiller 20 is less than or equal to the lower limit value (S121).

If the determination result indicates that the refrigerant superheat degree is not less than the lower limit value (S121-1), i.e., a value between the lower limit value and the upper limit value, the control part 30 performs control so that the rotation speed of the compressor 14 continues to be kept in a reduced state. Accordingly, the refrigerant superheat degree on the discharge side of the chiller 20 is induced to continuously increase until the refrigerant superheat degree exceeds the increased value.

On the other hand, if the determination result indicates that the refrigerant superheat degree is still less than the lower limit value (S121-2), the control part 30 recognizes that the refrigerant superheat degree on the discharge side of the chiller 20 is excessively low despite the primary and secondary induction of an increase in the refrigerant superheat degree.

Upon such recognition, the control part 30 enters a third step mode 36 to determine whether the current air conditioning mode is a battery independent cooling mode (S123).

If the determination result indicates that the current air conditioning mode is a battery independent cooling mode, the control part 30 maintains the opening degree of the battery-cooling expansion valve 20a as it is, and completely turns off the compressor 14 (e) (S125).

Accordingly, the refrigerant flow to the battery-cooling expansion valve 20a and the chiller 20 is completely blocked. As shown in FIG. 5, the refrigerant superheat degree on the discharge side of the chiller 20 is induced to increase in a third step. Thus, the refrigerant superheat degree on the discharge side of the chiller 20 exceeds the lower limit value.

Referring to FIG. 8, the control part 30 determines whether a preset time t4 has elapsed after the compressor 14 is turned off (e) (S127).

If it is determined that the preset time t4 has elapsed, the control part 30 turns on the compressor 14 and returns the compressor 14 to its original state, and also returns the opening degree of the battery-cooling expansion valve 20a to its original value (S129).

Referring again to FIG. 8, if the determination result in step S123 indicates that the current air conditioning mode is not the battery independent cooling mode (S123-1), the control part 30 determines again whether the current air conditioning mode is a vehicle interior/battery simultaneous cooling mode (S131).

If the determination result indicates that the current air conditioning mode is the vehicle interior/battery simultaneous cooling mode, the control part 30 maintains the rotation speed of the compressor 14 as it is, and completely turns off the battery-cooling expansion valve 20a (g) to control the opening degree thereof to become zero (S133).

Accordingly, the introduction of the refrigerant into the chiller 20 is completely blocked. As shown in FIG. 6, the refrigerant superheat degree on the discharge side of the chiller 20 is increased in a third step, whereby the refrigerant superheat degree can exceed the lower limit value.

Meanwhile, after the battery-cooling expansion valve 20a is turned off (g), the control part 30 determines whether a preset time t5 has elapsed (S135).

If it is determined that the preset time t5 has elapsed, the control part 30 turns on the battery-cooling expansion valve 20a and returns the opening degree thereof to its original value, and also returns the rotation speed of the compressor 14 to its original value (S137).

Second Embodiment

Next, a vehicular heat management system according to a second embodiment of the present invention will be described with reference to FIGS. 9 and 10.

In the first embodiment described above, when the refrigerant superheat degree on the discharge side of the chiller 20 is decreased to the lower limit value or less, the opening degree of the battery-cooling expansion valve 20a is reduced in a first step, and the rotation speed of the compressor 14 is reduced in a second step, thereby inducing the increase in the refrigerant superheat degree step by step.

In contrast, in the second embodiment, the rotation speed of the compressor 14 is reduced in a first step, and the opening degree of the battery-cooling expansion valve 20a is reduced in a second step, thereby inducing the increase in the refrigerant superheat degree step by step.

Figure 9:
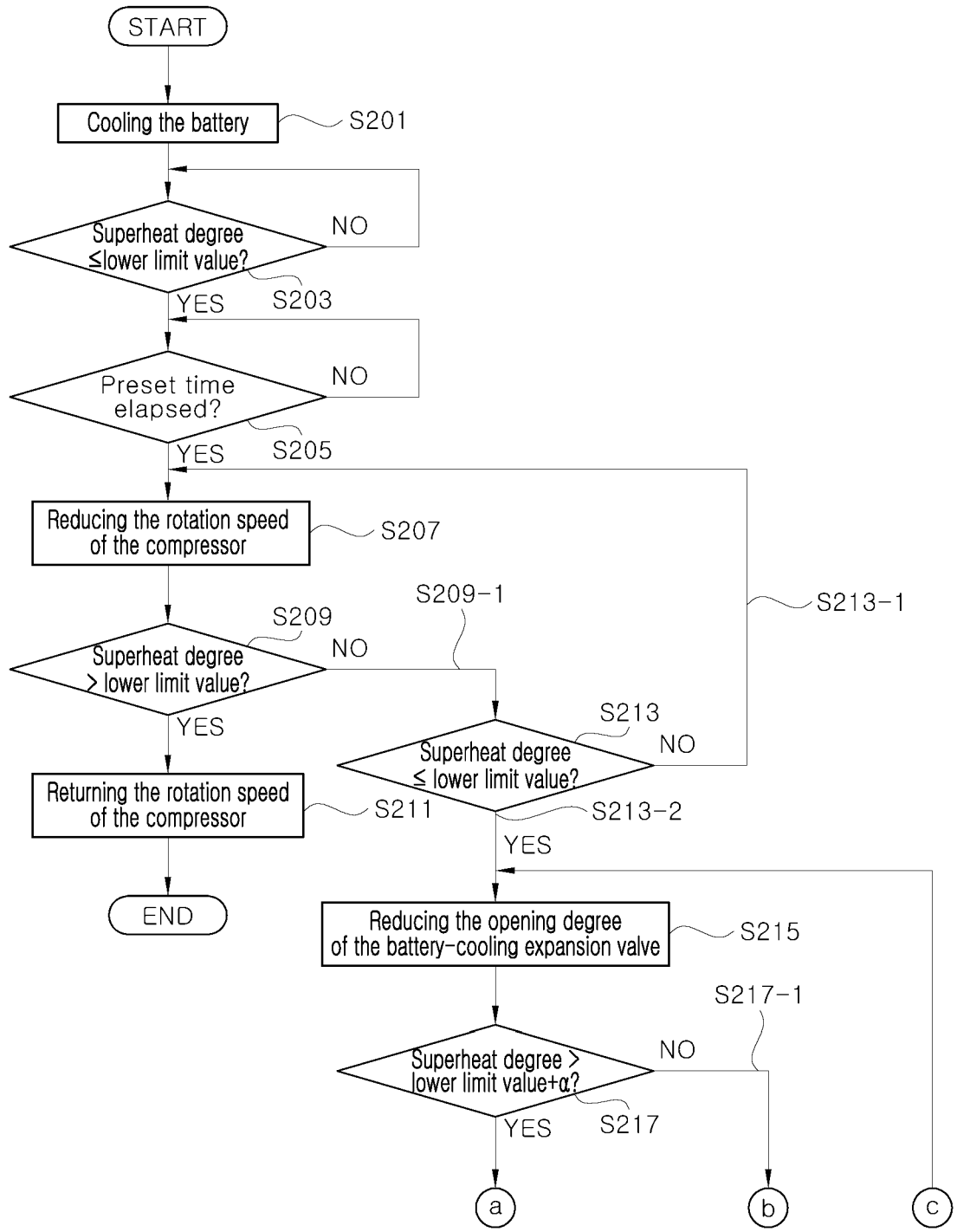
FIGS. 9 and 10 are flowcharts showing an operation example of a vehicular heat management system according to a second embodiment of the present invention.
Figure 10:
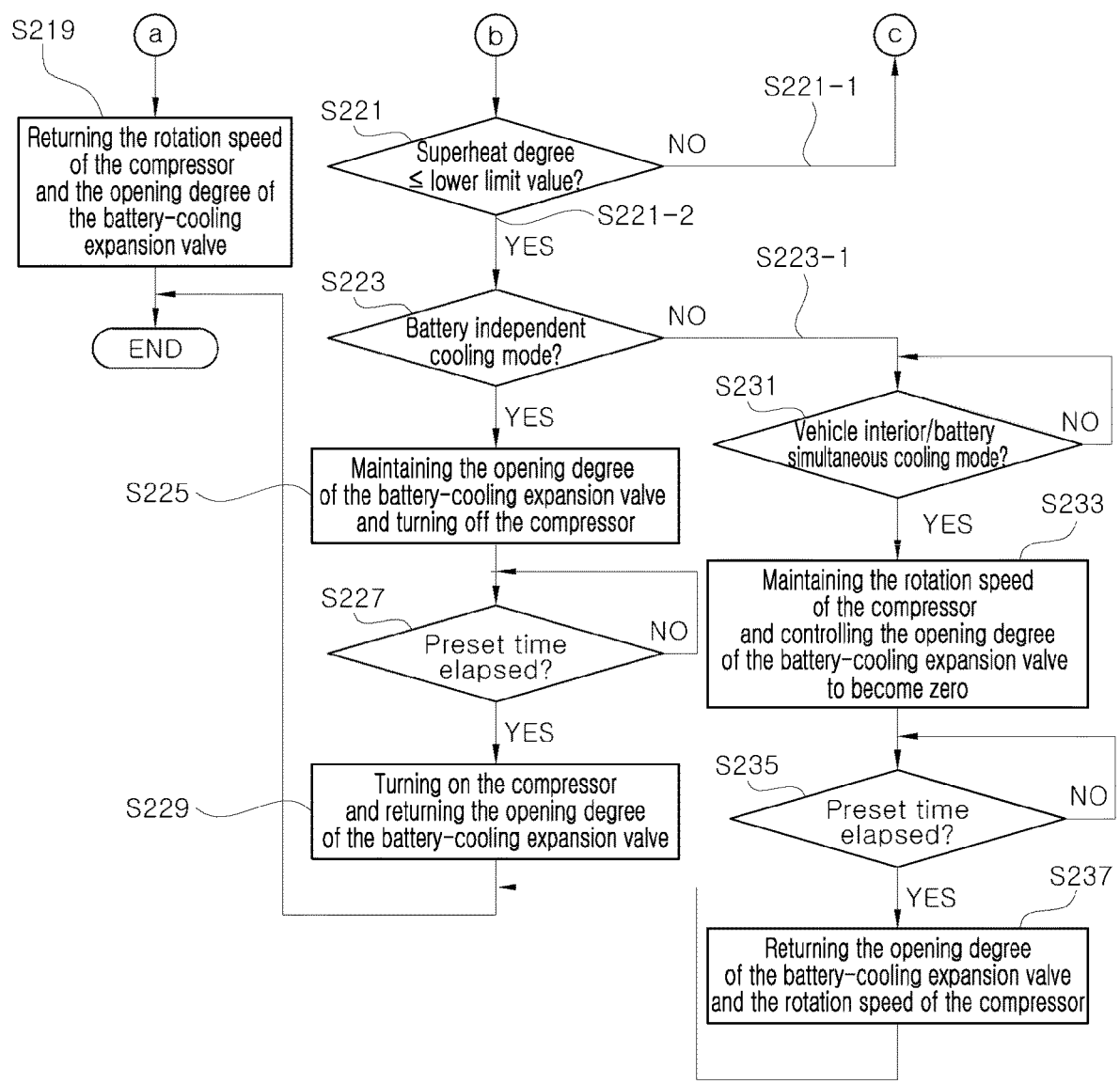

That is, in the second embodiment, as shown in FIG. 9, when a set time t1 has elapsed (S205) after the refrigerant superheat degree on the discharge side of the chiller 20 is lowered to the lower limit value or less (S203), first, the control part 30 enters the first step mode 32 to reduce the rotation speed of the compressor 14 by a preset value B (S207).

After reducing the rotation speed of the compressor 14 (S207), the control part 30 determines again whether the refrigerant superheat degree on the discharge side of the chiller 20 exceeds an increased value which is larger than the lower limit value by a predetermined value a (S209).

If the determination result indicates that the refrigerant superheat degree exceeds the increased value, the control part 30 determines that the excessive decrease in the refrigerant superheat degree has been resolved, and returns the rotation speed of the compressor 14 to its original value (S211).

If the determination result indicates that the refrigerant superheat degree does not exceed the increased value (S209-1), the control part 30 determines again whether the refrigerant superheat degree on the discharge side of the chiller 20 is less than or equal to the lower limit value (S213).

If the determination result indicates that the refrigerant superheat degree is not less than the lower limit value (S213-1), i.e., a value between the lower limit value and the upper limit value, the control part 30 performs control so that the rotation speed of the compressor 14 continues to be kept in a reduced state (S207).

On the other hand, if the determination result indicates that the refrigerant superheat degree is still less than the lower limit value (S213-2), the control part 30 enters the second step mode 34 to reduce the opening degree of the battery-cooling expansion valve 20a by a preset value A (S215).

Subsequent steps are the same as those of the first embodiment. Through these steps, the increase in the refrigerant superheat degree is induced step by step. As a result, the refrigerant superheat degree on the discharge side of the chiller 20 can be caused to exceed the lower limit value and can be maintained in a stable state.

According to the vehicular heat management system of the present invention having such a configuration, when the refrigerant superheat degree on the discharge side of the chiller 20 is less than or equal to the lower limit value, the battery-cooling expansion valve 29a and the compressor 14 are sequentially controlled to increase the refrigerant superheat degree step by step until the refrigerant superheat degree exceeds the lower limit value.

Therefore, it is possible to induce an increase in the refrigerant superheat degree without unconditionally turning off the compressor 14 when the refrigerant superheat degree is less than or equal to the lower limit value.

Since the increase in the refrigerant superheat degree can be induced without unconditionally turning off the compressor 14, it is possible to minimize the turnoff of the compressor 14 under a condition that the refrigerant superheat degree is less than or equal to the lower limit value.

Since the turnoff of the compressor 14 can be minimized under the condition that the refrigerant superheat degree is less than or equal to the lower limit value, it is possible to minimize the operation stop of the chiller 20 due to the frequent turnoff of the compressor 14 and the resultant stop of cooling of the battery B. Thus, it is possible to prevent the overheating of the battery B due to the turnoff of the compressor 14 and the resultant performance reduction and damage of the battery B.

Since the turnoff of the compressor 14 can be minimized when the refrigerant superheat degree is less than or equal to the lower limit value, it is possible to prevent the frequent on/off operation of the compressor 14 under the condition that the refrigerant superheat degree is less than or equal to the lower limit value. As a result, it is possible to prevent the durability reduction and damage of the compressor 14 due to the frequent on/off operation of the compressor 14.

While the preferred embodiments of the present invention have been described above, the present invention is not limited to the above-described embodiments. Various modifications and changes may be made without departing from the scope and spirit of the present invention defined in the claims.

What is claimed is:

1. A vehicular heat management system, comprising:
a compressor;
a condensing heat exchanger;
an expansion valve;
an evaporation heat exchanger; and
a control part configured to, when a refrigerant superheat degree on a discharge side of the evaporation heat exchanger is lowered to a predetermined lower limit value or less, control, step by step, at least two devices directly involved in the increase and decrease of the refrigerant superheat degree to increase the refrigerant superheat degree until the refrigerant superheat degree exceeds the lower limit value,
wherein the evaporation heat exchanger includes a plurality of evaporation heat exchangers,
the expansion valve on the upstream side of one of the plurality of evaporation heat exchangers is an electromagnetic expansion valve (EXV),
the control part is configured to, when a refrigerant superheat degree on the discharge side of an electromagnetic-expansion-valve-side evaporation heat exchanger is lowered to the lower limit value or less, control the compressor and the electromagnetic expansion valve to increase the refrigerant superheat degree until the refrigerant superheat degree exceeds the lower limit value,
the plurality of evaporation heat exchangers includes a chiller for cooling a battery,
the control part is configured to, when a refrigerant superheat degree on the discharge side of the chiller is lowered to the lower limit value or less, control a rotation speed of the compressor and an opening degree of an electromagnetic battery-cooling expansion valve to increase the refrigerant superheat degree until the refrigerant superheat degree exceeds the lower limit value, and
when the refrigerant superheat degree on the discharge side of the chiller is lowered to the lower limit value or less, the control part is configured to:
firstly reduce the opening degree of the battery-cooling expansion valve to induce an increase in the refrigerant superheat degree on the discharge side of the chiller in a first step;
secondly reduce the rotation speed of the compressor to induce an increase in the refrigerant superheat degree on the discharge side of the chiller in a second step; and thirdly completely turn off one of the battery-cooling expansion valve and the compressor to limit a refrigerant flow toward the chiller to induce an increase in the refrigerant superheat degree on the discharge side of the chiller in a third step, so that the refrigerant superheat degree on the discharge side of the chiller exceeds the lower limit value.

2. The system of claim 1, wherein the control part is configured to:
enter a first step mode to reduce the opening degree of the battery-cooling expansion valve by a preset value when the refrigerant superheat degree on the discharge side of the chiller is lowered to the lower limit value or less and is then maintained less than or equal to the lower limit value for a preset time;
enter a second step mode to reduce the rotation speed of the compressor by a preset value when the refrigerant superheat degree on the discharge side of the chiller is less than or equal to the lower limit value after the opening degree of the battery-cooling expansion valve is reduced; and
enter a third step mode to completely turn off one of the battery-cooling expansion valve and the compressor according to an air conditioning mode state to limit a refrigerant flow toward the chiller when the refrigerant superheat degree on the discharge side of the chiller is less than or equal to the lower limit value after the rotation speed of the compressor is reduced.

3. The system of claim 2, wherein the control part is configured to:
determine whether the refrigerant superheat degree on the discharge side of the chiller exceeds an increased value larger than the lower limit value by a predetermined value after the control part enters the first step mode to reduce the opening degree of the battery-cooling expansion valve;
return the opening degree of the battery-cooling expansion valve to a state available before the first step mode when the refrigerant superheat degree on the discharge side of the chiller exceeds the increased value;
determine again whether the refrigerant superheat degree on the discharge side of the chiller is less than or equal to the lower limit value when the refrigerant superheat degree on the discharge side of the chiller does not exceed the increased value;
enter the second step mode to reduce the rotation speed of the compressor when the refrigerant superheat degree on the discharge side of the chiller is less than or equal to the lower limit value; and
control the opening degree of the battery-cooling expansion valve so as to be kept in a reduced state when the refrigerant superheat degree on the discharge side of the chiller is not less than or equal to the lower limit value.

4. The system of claim 2, wherein the control part is configured to:
when entering the first step mode, reduce the opening degree of the battery-cooling expansion valve by a preset value either immediately in a stepwise manner or linearly with a constant slope for a predetermined time; and
when entering the second step mode, reduce the rotation speed of the compressor by a preset value either immediately in a stepwise manner or linearly with a constant slope for a predetermined time.

5. The system of claim 1, wherein if the current air conditioning mode is a battery independent cooling mode when entering the third step mode, the control part is configured to turn off the compressor to completely cut off the refrigerant flow to the battery-cooling expansion valve and the chiller.

6. The system of claim 1, wherein when the current air conditioning mode is a battery independent cooling mode, the control part is configured to turn off the compressor and control the opening degree of the battery-cooling expansion valve so as to remain as it is or become zero.

7. The system of claim 6, wherein if a preset time has elapsed or the refrigerant superheat degree on the discharge side of the chiller exceeds the increased value larger than the lower limit value by the predetermined value after the compressor is turned off, the control part is configured to turn on the compressor to return the compressor to an original state available before the first step mode and return the opening degree of the battery-cooling expansion valve to an original state available before the first step mode.

8. The system of claim 7, wherein if the current air conditioning mode is a vehicle interior/battery simultaneous cooling mode when entering the third step mode, the control part is configured to control the opening degree of the battery-cooling expansion valve so as to become zero.

9. The system of claim 8, wherein if a preset time has elapsed or the refrigerant superheat degree on the discharge side of the chiller exceeds the increased value larger than the lower limit value by the predetermined value after the opening degree of the battery-cooling expansion valve is controlled to become zero, the control part is configured to return the opening degree of the battery-cooling expansion valve to an original state available before the first step mode and also return the rotation speed of the compressor to an original state available before the first step mode.

10. The system of claim 5, wherein the control part is configured to:
determine whether the refrigerant superheat degree on the discharge side of the chiller exceeds an increased value larger than the lower limit value by a predetermined value after the control part enters the second step mode to reduce the rotation speed of the compressor;
return the rotation speed of the compressor to an original state available before the first step mode when the refrigerant superheat degree on the discharge side of the chiller exceeds the increased value;
determine again whether the refrigerant superheat degree on the discharge side of the chiller is less than or equal to the lower limit value when the refrigerant superheat degree on the discharge side of the chiller does not exceed the increased value;
enter the third step mode to completely turn off one of the battery-cooling expansion valve and the compressor according to an air conditioning mode state to limit a refrigerant flow toward the chiller when the refrigerant superheat degree on the discharge side of the chiller is less than or equal to the lower limit value; and
control the rotation speed of the compressor so as to be kept in a reduced state when the refrigerant superheat degree on the discharge side of the chiller is not less than or equal to the lower limit value.

11. The system of claim 1, wherein when the refrigerant superheat degree on the discharge side of the chiller is lowered to the lower limit value or less, the control part is configured to:
firstly reduce the rotation speed of the compressor to induce an increase in the refrigerant superheat degree on the discharge side of the chiller in a first step;

secondly reduce the opening degree of the battery-cooling expansion valve to induce an increase in the refrigerant superheat degree on the discharge side of the chiller in a second step; and thirdly completely turn off one of the battery-cooling expansion valve and the compressor to limit a refrigerant flow toward the chiller to induce an increase in the refrigerant superheat degree on the discharge side of the chiller in a third step, so that the refrigerant superheat degree on the discharge side of the chiller exceeds the lower limit value.

* * * * *